[19] United States Patent
Jordan

[11] 3,719,758
[45] March 6, 1973

[54] METHOD OF PROMOTING GROWTH AND IMPROVING FEED EFFICIENCY IN POULTRY AND SWINE VIA ORAL ADMINISTRATION OF CEPHALOSPORIN C

[75] Inventor: Charles E. Jordan, Greenfield, Ind.
[73] Assignee: Eli Lilly and Company, Indianapolis, Ind.
[22] Filed: June 19, 1970
[21] Appl. No.: 47,859

[52] U.S. Cl. ................................................. 424/246
[51] Int. Cl. .............................................. A61k 27/00
[58] Field of Search ..................................... 424/246

[56] References Cited

UNITED STATES PATENTS

| | | | |
|---|---|---|---|
| 3,296,258 | 1/1967 | Vischer et al. | 260/243 |
| 3,393,193 | 2/1967 | Godfrey | 260/243 |
| 3,311,621 | 3/1967 | Crast | 260/243 |

OTHER PUBLICATIONS

Merck Index, Eighth edit (1968) page 222

*Primary Examiner*—Sam Rosen
*Attorney*—Everet F. Smith and Walter E. Buting

[57] ABSTRACT

Method of promoting growth and improving feed efficiency in poultry and swine comprising administering orally thereto an effective amount of cephalosporin C [7-(5'-aminoadipamido) cephalosporanic acid], and compositions containing said cephalosporin C.

3 Claims, No Drawings

METHOD OF PROMOTING GROWTH AND IMPROVING FEED EFFICIENCY IN POULTRY AND SWINE VIA ORAL ADMINISTRATION OF CEPHALOSPORIN C

BACKGROUND OF THE INVENTION

1. Field of Invention

This invention relates to the promotion of growth in poultry and swine. Specifically, it relates to an improved method and means for accelerating the growth rate in poultry and swine and for simultaneously increasing the efficiency of feed utilization thereby.

2. Description of the Prior Art

It is well known that the acceleration of growth rates and an increase in the efficiency of feed utilization in meat animals is an important consideration in agricultural economics. A faster growth rate provides the opportunity for greater use of the facilities employed in raising the meat animal, thus improving return on investment. An increase in the efficiency of feed utilization results in a lowered cost of production. Both potential benefits improve the prospects for a reduction in the price paid by the consumer for meat products.

Concerted efforts exerted in recent years in both poultry and swine husbandry have resulted in genetic advancements such that broiler chickens, to about 8 weeks of age, and weanling pigs, from about 20 to about 50 pounds, gain about a pound of weight for every 2 pounds of feed consumed.

In the search for effective growth promotants it is recognized that a relatively small improvement in growth rates and feed efficiency can be advantageous. For example, it is generally believed that in broiler chickens a growth rate acceleration of about 3 percent or more, and an increase in feed efficiency of about 2 percent or more is economically worthwhile, particularly where the active compound is used in relatively small quantities and is favorably priced to the grower.

Heretofore, a number of compounds have been used as growth promotants for poultry and swine. Among such compounds are some antibiotics, such as, penicillin, bacitracin, chlortetracycline, and tylosin; sulfanilamides, arsenicals, and the like. None of the prior art compounds is effective in economically feasible quantities under all environmental conditions. Effective, economical methods for accelerating growth rates and increasing feed efficiency in poultry and swine under widely divergent environmental conditions would, therefore, constitute a significant advance in the art.

SUMMARY

This invention provides a method for economically accelerating weight gains and increasing feed efficiency in poultry and swine, which method comprises orally administering daily cephalosporin C having the formula:

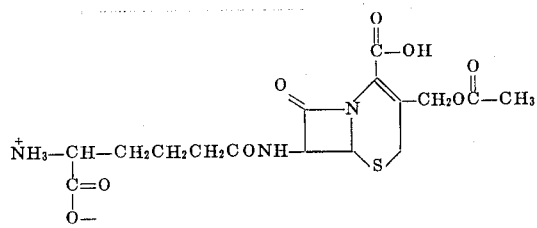

as a component in the feed to said poultry and swine.

DESCRIPTION OF THE PREFERRED EMBODIMENTS

Cephalosporin C, more precisely known as 7-(5'-amino-adipamido)cephalosporanic acid, having the structural formula:

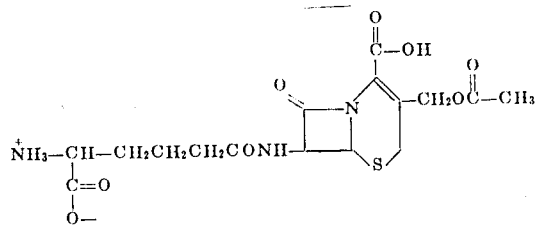

is a substance produced by cultivating a cephalosporin C producing strain of *Cephalosporium* in a suitable nutrient medium as described with more detail in U.S. Pat. No. 3,093,638.

In the useful processes of this invention, cephalosporin C can be employed as such or as a non-toxic salt. Since cephalosporin C has both acidic and basic functional groups, it is capable of forming salts with both acids and bases by methods well known in the art. Salts with acids can include those formed with either inorganic or organic acids, as for example, hydrochloric, hydrobromic, sulfuric, phosphoric, acetic, propionic, citric, oxalic, maleic, malic, succinic, tartaric, toluenesulfonic, naphthalene-sulfonic and like acids. Similarly, salts with bases can be prepared with either organic or inorganic bases and can include the lithium, potassium, sodium, magnesium, calcium, ammonium, mono-, di-, and triethanol amine, mono-, di-, and tri- $C_1$–$C_2$ alkylamine, and like salts. Such salts can be formed with one or both of the available carboxyl groups of cephalosporin C.

It has been found that the daily oral administration of a growth promoting quantity of cephalosporin C, or a suitable derivative thereof, as a component in the feed consumed by poultry and swine significantly accelerates the growth rate of the animals and improves the efficiency of feed utilization. The daily ingestion by poultry and swine of cephalosporin C or a suitable derivative thereof in an amount of from about 1 mg. to about 50 mg./kg. of body weight results in a faster growth than that registered by animals fed the same basal ration without the active agent. For example, broiler cockerels ingesting about 5 mg./kg. of the sodium salt of cephalosporin C daily gained 4.24 percent more weight and consumed 3.79 percent less total feed from age 7 days to age 35 days than comparable cockerels eating the same basal ration. The term "basal ration" as used herein refers to the total feed intake of the animal, which may take the form of a complete feed ration into which are incorporated in one composition all of the elements constituting the dietary requirements of the animal, or may be regarded as the sum of all of the elements contained in various feedstuffs, concentrates, supplements, mineral, vitamin or medicated premixes, roughages, or the like, which are fed to the animal. The composition and analysis of a typical poultry basal ration fed as a complete feed is shown in Table I, below.

TABLE I

Broiler Basal Ration

| INGREDIENTS | Percent | Lbs./ton |

| | | |
|---|---|---|
| Corn, Yellow, Ground | 53.90 | 1078 |
| Soybean Oil Meal Sol. Ext. 50% | 29.00 | 580 |
| Distillers Dried Sol. (Corn) | 2.50 | 50 |
| Alfalfa Meal, Dehydrated 17% | 2.50 | 50 |
| Whey, Dried | 1.00 | 20 |
| Fish Meal (Menh) + Sol. | 4.00 | 80 |
| Animal Fat | 4.00 | 80 |
| Dicalcium Phosphate, Feed Grade | 1.70 | 34 |
| Calcium Carbonate | 0.50 | 10 |
| Salt (NaCl) | 0.30 | 6 |
| Trace Mineral Premix[1] | 0.10 | 2 |
| Vitamin Mix CK-01 (1.02)[2] | 0.50 | 10 |
| Methionine Hydroxy Analogue (80%) | 0.062 | 1.25 |
| Totals | 100.062 | 2001.25 |

[1] Trace Mineral Premix contains: 6.7% manganese as manganese sulfate, 0.09% iodine as potassium iodide, 0.17% copper as copper oxide, 7.5% zinc and zinc carbonate, and 1.7% iron as ferrous sulfate.
[2] Each pound contains: 450,000 I.U. vitamin A, 120,000 I.C.U. vitamin $D_3$, 1,000 I.U. vitamin E, 400 mg. riboflavin, 3,600 mg. niacin, 966 mg. d-panthothenic acid, 26,037 mg. choline, 1 mg. vitamin $B_{12}$ and 100 mg. menadione sodium bisulfite.

Moreover, pigs ingesting about 20 mg./kg. of the sodium salt of cephalosporin C gained 45 percent more weight and consumed 12.3 percent less feed per pound of weight gained from age 4 to age 10 weeks than comparable pigs eating the same basal ration but without the active compound. The composition and analysis of a typical swine basal ration is shown in Table II, below.

TABLE II

Swine Basal Starter Ration

| INGREDIENTS | Percent | Lbs./ton |
|---|---|---|
| Corn, Yellow, Ground | 69.25 | 1385 |
| Alfalfa Meal, Dehydrated 17% | 2.50 | 50 |
| Soybean Oil Meal, Solvent Extracted Dehulled 50% | 17.00 | 340 |
| Meat Scraps, 55% | 2.50 | 50 |
| Fish Meal with Solubles | 2.50 | 50 |
| Distillers Dried Solubles (Corn) | 2.50 | 50 |
| Animal Fat | 2.00 | 40 |
| Salt (NaCl) | 0.50 | 10 |
| Dicalcium Phosphate, Feed Grade | 0.50 | 10 |
| Calcium Carbonate | 0.20 | 4 |
| Trace Mineral Premix[1] | 0.05 | 1 |
| Vitamin Premix - SW-03 [2] | 0.50 | 10 |
| Totals | 100.00 | 2000 |

[1] Trace Mineral Premix contains: 10.00% manganese as manganese sulfate, 0.30% iodine as potassium iodide, 0.10% cobalt as cobalt carbonate, 6.00% iron as ferrous carbonate, 1.00% copper as copper oxide, 10.00% zinc as zinc sulfate and zinc oxide, and 11.50% maximum and 8.50% minimum calcium as calcium carbonate.
[2] Each pound contains: 35,000 USP units vitamin $D_2$, 200 mg. riboflavin, 1,000 mg. niacin, 735 mg. pantothenic acid, 8,700 mg. choline and 2 mg. vitamin $B_{12}$.

The normal consumption of feed containing from about 5 grams to about 500 grams of cephalosporin C or a suitable derivative thereof per ton of basal ration will result in the ingestion by poultry and swine of the desired daily amounts of the active ingredient.

While the useful process of this invention requires the oral administration of an antibiotic, namely, cephalosporin C or a suitable derivative thereof, the enhanced weight gains and improved feed efficiency achieved do not appear to be attributable merely to an antibiotic effect. Except as to their effect upon *Salmonella* spp. and *Vibrio coli*, the useful agents are exceedingly low in antibiotic activity. Cephalosporin C, for example, has an antibiotic activity of only about 10 to 15 penicillin G units per milligram, as measured against *Staphylococcus aureus* 209P in a conventional disc plate assay test, yet it is an effective agent in promoting the growth rates of poultry and swine. The precise mechanism by which the observed effect is achieved is thus unknown.

Because of their greater water solubility, ease of preparation, and amenability to incorporation into various medicated feeds, the use of the sodium, potassium and amine salts of cephalosporin C is preferred in the practice of this invention.

In a preferred embodiment of the present invention, a salt of cephalosporin C is administered orally in a suitable feed in which the active compound is present in an amount of from about 5 to about 500 grams per ton of total feed, the exact concentration employed being that which is required to provide for the ingestion of an effective dosage of the active agent when normal amounts of feed are consumed. The addition of the active compounds of the useful process of this invention to animal feed is preferably accomplished by preparing an appropriate feed premix containing from about 1 to about 100 grams of cephalosporin C per pound of premix and incorporating the premix into the complete ration. Alternatively, an intermediate concentrate or feed supplement containing the active agent can be blended into the feed.

The preparation of an appropriate feed premix can be effected by grinding the active compounds utilized in the novel process of this invention to a powder and admixing with a suitable premix carrier. The term "suitable premix carrier" as used in this disclosure may refer to an edible feedstuff which constitutes a normal dietary ingredient of the animal, such as, alfalfa grits, solvent-extracted soybean feed, ground corn, and the like, or a combination of components of a feed ration, or a physiologically utilizable mineral or vitamin concentrate or supplement, or the like. Alternatively the term may refer to a bland non-irritating material which is acceptable by the animal, but which is not physiologically utilizable, as for example, ground corn cobs, exfoliated hydrobiotite, or the like. The premix so prepared is then admixed with whatever feed ration is being fed to the animals at the time of administering the active agents employed in the useful process of the present invention. The feed premix can be diluted first with a feed supplement or feed concentrate to a desired concentration of the active compound, and the medicated supplement or concentrate can either be fed concurrently with the remainder of the ration or mixed into the final feed.

An alternative procedure for preparing the premix comprises dispersing the active compound in a suitable vehicle such as an edible vegetable oil, an edible glyceride, or an edible glycol, and spraying such dispersion onto the premix carrier with suitable mixing.

This invention is further illustrated by the following examples.

EXAMPLE 1

This test was run to compare weight gains and feed efficiencies in broiler chickens when the sodium salt of cephalosporin C was fed in an amount of 50 grams of active compound per ton of basal ration with those observed when the basal ration with no growth promotant included therein was employed.

Forty battery pens of 8 chicks each were utilized. The birds were 7-day-old broiler chicks (Arbor Acres Strain 50) at the start of the test. All of the birds were provided with the same basal ration (Table I, above) during the 3 weeks of the test. Thirty pens, a total of 240 birds, were provided with the basal ration without a growth promotant. Ten pens, a total of 80 birds, were provided with the same ration containing, in addition, the sodium salt of the cephalosporin C at a level of 50 grams per ton. The chicks were randomly assigned to the pens, and the test was conducted in a climate-controlled environment.

All birds were group weighed at 7 and 28 days of age. Feed consumption and efficiency were calculated at 28 days of age.

The birds fed the sodium salt of cephalosporin C produced a 4.24 percent greater weight gain and showed a 3.79 percent improvement in feed efficiency over the birds receiving no growth promotant.

Table III shows the test results.

TABLE V
Broiler Finisher Ration

| INGREDIENTS | Percent | Lbs./ton |
|---|---|---|
| Corn, Yellow, Ground | 65.8 | 1316 |
| Soybean Oil Meal Sol. Ext. (50%) | 26.4 | 528 |
| Animal Fat | 3.90 | 78.0 |
| Dicalcium Phosphate, Feed Grade | 2.30 | 46.0 |
| Calcium Carbonate | 0.70 | 14.0 |
| Salt (NaCl) | 0.40 | 8.0 |
| Trace Mineral Premix[1] | 0.10 | 2.0 |
| Vitamin Mix CK-01 (1.02)[2] | 0.50 | 10.0 |
| Totals | 100.10 | 2002.0 |

[1] Trace Mineral Premix contains: 6.7% manganese as manganese sulfate, 0.09% iodine as potassium iodide, 0.17% copper as copper oxide, 7.5% zinc and zinc carbonate, and 1.7% iron as ferrous sulfate.

[2] Each pound contains: 450,000 I.U. vitamin A, 120,000 I.C.U. vitamin D$_3$, 1,000 I.U. vitamin E, 400 mg. riboflavin, 3,600 mg. niacin, 966 mg. d-panthothenic acid, 26,037 mg. choline, 1 mg. vitamin B$_{12}$ and 100 mg. menadione sodium bisulfite.

TABLE III
Test Results

| Additive | Conc. in feed, g./ton | No. of birds Started | No. of birds Died | Ave. weight Initial 7-days, g. | Ave. weight 28-days, g. | Ave. gain 21-days, g. | Ave. feed consumed per bird, g. | Feed efficiency |
|---|---|---|---|---|---|---|---|---|
| None | None | 240 | 2 | 107 | 602 | 495 | 812 | 1.64 |
| Cephalosporin C, sodium salt | 50 | 80 | 1 | 107 | 623 | [1] 516 | 813 | [2] 1.58 |

[1] Represents a 4.24 percent weight gain increase over the control birds.
[2] Represents a 3.79 percent improvement in feed efficiency over the control birds.

EXAMPLE 2

This test was run to compare weight gains and feed efficiencies when the sodium salt of cephalosporin C was fed in an amount of 10 grams of active compound per ton of basal ration, with those observed when a combination of 5 grams of procaine penicillin G and 5 grams of tylosin (a known growth promotant) was employed per ton of basal ration.

Six groups of 7-day-old broiler chicks (Arbor Acre Strain 50 cockerels) were utilized. All of the chicks were provided with the same chick starter ration (Table I, above) during the first 21 days of the test and the same finisher ration (Table V, below) during the last 14 days of the test. Three groups of the chicks, totaling 461 birds, were provided with feed containing the sodium salt of cephalosporin C and three groups, totaling 455 birds, received feed containing the procaine penicillin G - tylosin combination. Each group of birds was placed in a 16 × 28 foot pen in which a gas-fired brooder was used to provide heat during the first 3 weeks. The chicks were randomly assigned to the pens.

All birds were group weighed at 7, 28, and 42 days of age. Feed consumption and efficiency were calculated at 42 days.

The birds fed the sodium salt of cephalosporin C produced a 2.6 percent greater weight gain than the birds fed the combination of procaine penicillin G and tylosin. Feed efficiencies were substantially the same.

The results of the test are shown in Table IV.

EXAMPLE 3

Seventy-three pure-bred Hampshire pigs were employed in this test to compare the effect of cephalosporin C at various levels as a growth promoter. The animals were allotted to nine pens, the distribution being random with respect to weight, sex, litter, and previous treatment. The pigs had received routine care at birth, and were weighed, ear-notched, and tusked on the first day after birth. Each pig was injected with 100 mg. of iron (administered as iron dextran) at 3 days of age and with 50 mg. additional at 2 weeks of age. The male pigs were castrated at 2 weeks of age. Basal starter ration (Table II, above) was placed before the pigs at 2 weeks of age, and the pigs were weaned at 5 weeks of age. The various treatments, described hereinafter, were randomly assigned among the nine pens. The pigs were at a uniform age when they were placed on test.

Three pens of animals were employed in each of three test programs: one employing the unmodified swine starter ration, a second employing the same ration into which cephalosorin C had been incorporated at a concentration of 50 grams per ton, and a third employing the same starter ration with cephalosporin C at a level of 100 grams per ton.

The results of the tests, given in Table VI, were as follows:

TABLE IV
Test Results

| Additive | Conc. in feed, g./ton | No. of birds Started | No. of birds Died | Ave. weight Initial 7-days, g. | Ave. weight 42-days, g. | Ave. gain 35-days, g. | Ave. feed consumed per bird, g. | Feed efficiency |
|---|---|---|---|---|---|---|---|---|
| Procaine penicillin G plus Tylosin | 5 } 5 | 455 | 3 | 92 | 1,080 | 988 | 1,991 | 2.01 |
| Cephalosporin C, sodium salt | 10 | 461 | 7 | 90 | 1,104 | [1] 1,014 | 2,010 | 1.98 |

[1] Represents 2.6 percent increase over birds fed procaine penicillin G and tylosin.

The group receiving cephalosporin C showed an increase in growth response of 45.0 percent at the 50 grams per ton level (0.87 vs. 0.60 lb./pig/day) and 33.3 percent at the 100 gram per ton level (0.80 vs. 0.60 lb./pig/day).

Feed intake was increased in all treatment groups as compared to the controls, and there was a linear correlation between feed consumption and growth rate.

Feed efficiency was improved 12.3 percent by cephalosporin C at the 50 gram level and 10.6 percent at the 100 gram level.

TABLE VI

Test Results

| Additive | G./ton | No. pigs | Ave. weight Initial lbs. | Ave. weight Final lbs. | Ave. daily gain, lbs. | Ave. daily feed, lbs. | Feed efficiency |
|---|---|---|---|---|---|---|---|
| Cephalosporin C | 50 | 25 | 22.1 | 58.5 | 0.87 | 1.79 | 2.07 |
| Do | 100 | 24 | 21.8 | 55.2 | 0.80 | 1.68 | 2.11 |
| None | | 24 | 22.0 | 47.0 | 0.60 | 1.41 | 2.36 |

What is claimed is:

1. A method for promoting growth and improving feed efficiency in poultry and swine which comprises orally administering to said poultry and swine an effective amount of cephalosporin C having the following structural formula:

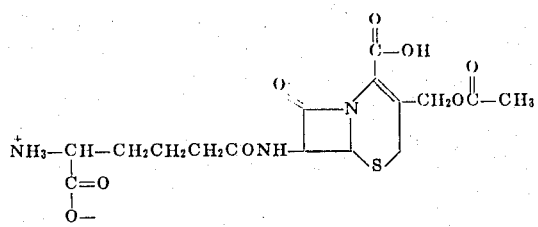

or a non-toxic salt thereof.

2. The method of claim 1 wherein cephalosporin C is administered orally in a daily amount of from about 1 to about 50 mg./kg. of body weight.

3. The method of claim 1 wherein cephalosporin C is orally administered as a component in animal feed containing from about 5 to about 500 grams of cephalosporin C per ton of total feed.

* * * * *